US010961384B2

(12) United States Patent
Von Bernstorff et al.

(10) Patent No.: US 10,961,384 B2
(45) Date of Patent: Mar. 30, 2021

(54) PROCESS FOR IMPROVING THE FLEXURAL TOUGHNESS OF MOLDINGS

(71) Applicant: BASF SE, Ludwigshafen (DE)

(72) Inventors: Bernd-Steffen Von Bernstorff, Wachenheim (DE); Marie-Claire Hermant, Mannheim (DE); Martin Blömacher, Meckenheim (DE)

(73) Assignee: BASF SE, Ludwigshafen am Rhein (DE)

( * ) Notice: Subject to any disclaimer, the term of this patent is extended or adjusted under 35 U.S.C. 154(b) by 445 days.

(21) Appl. No.: 15/312,361

(22) PCT Filed: May 20, 2015

(86) PCT No.: PCT/EP2015/061107
§ 371 (c)(1),
(2) Date: Nov. 18, 2016

(87) PCT Pub. No.: WO2015/177208
PCT Pub. Date: Nov. 26, 2015

(65) Prior Publication Data
US 2017/0114216 A1    Apr. 27, 2017

(30) Foreign Application Priority Data

May 21, 2014  (EP) ..................................... 14169200

(51) Int. Cl.
| C08L 59/02 | (2006.01) |
| C08L 59/04 | (2006.01) |
| C08G 2/10 | (2006.01) |
| C08G 2/04 | (2006.01) |
| C08G 2/24 | (2006.01) |
| B22F 1/00 | (2006.01) |
| C04B 35/565 | (2006.01) |
| C04B 35/46 | (2006.01) |
| C04B 35/111 | (2006.01) |
| C04B 35/50 | (2006.01) |
| C04B 35/486 | (2006.01) |
| C04B 35/58 | (2006.01) |
| C04B 35/634 | (2006.01) |
| C04B 35/581 | (2006.01) |
| C04B 35/584 | (2006.01) |
| C08K 3/08 | (2006.01) |
| C08L 71/02 | (2006.01) |
| C08L 23/00 | (2006.01) |

(52) U.S. Cl.
CPC ............ *C08L 59/02* (2013.01); *B22F 1/0059* (2013.01); *B22F 1/0062* (2013.01); *C04B 35/111* (2013.01); *C04B 35/46* (2013.01); *C04B 35/486* (2013.01); *C04B 35/50* (2013.01); *C04B 35/565* (2013.01); *C04B 35/581* (2013.01); *C04B 35/584* (2013.01); *C04B 35/58071* (2013.01); *C04B 35/634* (2013.01); *C04B 35/63488* (2013.01); *C08G 2/04* (2013.01); *C08G 2/10* (2013.01); *C08G 2/24* (2013.01); *C08K 3/08* (2013.01); *C08L 23/00* (2013.01); *C08L 59/04* (2013.01); *C08L 71/02* (2013.01); *B22F 2301/35* (2013.01); *B22F 2302/45* (2013.01); *B22F 2998/10* (2013.01); *C04B 2235/48* (2013.01); *C04B 2235/5436* (2013.01); *C04B 2235/5445* (2013.01); *C04B 2235/6022* (2013.01); *C04B 2235/96* (2013.01); *C08L 2205/06* (2013.01)

(58) Field of Classification Search
CPC .......... C08L 59/02; C08L 23/00; C08L 59/04; C08L 71/02; C08L 2205/06; B22F 1/0059; B22F 1/0062; B22F 2301/35; B22F 2302/45; B22F 2998/10; C04B 35/111; C04B 35/46; C04B 35/486; C04B 35/50; C04B 35/565; C04B 35/5807; C04B 35/581; C04B 35/584; C04B 35/634; C04B 35/63488; C04B 2235/48; C04B 2235/5436; C04B 2235/5445; C04B 2235/6022; C04B 2235/96; C08G 2/04; C08G 2/10; C08G 2/24; C08K 3/08
See application file for complete search history.

(56) References Cited

U.S. PATENT DOCUMENTS

| 4,108,838 | A | * | 8/1978 | Amann | ................... | C08G 2/10 |
| | | | | | | 528/249 |
| 5,198,489 | A | | 3/1993 | Sterzel et al. | | |
| 6,080,808 | A | | 6/2000 | Sterzel | | |
| 6,388,049 | B1 | * | 5/2002 | Yokoyama | ............... | C08G 2/10 |
| | | | | | | 525/398 |
| 7,682,704 | B2 | | 3/2010 | Dwivedi | | |
| 7,731,894 | B2 | | 6/2010 | Pflaumer et al. | | |
| 2009/0288739 | A1 | * | 11/2009 | Wohlfromm | .......... | B22F 1/0059 |
| | | | | | | 148/522 |
| 2012/0294749 | A1 | | 11/2012 | ter Maat et al. | | |
| 2013/0062820 | A1 | | 3/2013 | ter Maat et al. | | |

FOREIGN PATENT DOCUMENTS

| DE | 10084853 | T1 | 9/2002 |
| EP | 0128739 | A1 | 12/1984 |
| EP | 0129369 | A1 | 12/1984 |
| EP | 0444475 | A2 | 9/1991 |
| EP | 0446708 | A2 | 9/1991 |

(Continued)

OTHER PUBLICATIONS

International Preliminary Examination Report with Annexes (in English) for PCT/EP2015/061107 dated Aug. 30, 2016.

(Continued)

*Primary Examiner* — Peter D. Mulcahy
(74) *Attorney, Agent, or Firm* — Faegre Drinker Biddle & Reath LLP

(57) ABSTRACT

Poly-1,3-dioxepane, poly-1,3-dioxolane, polytetrahydrofurane or mixtures thereof are used in molding materials comprising polyoxymethylene or a copolymer containing a majority of oxymethylene units, for improving the flexural toughness of moldings formed from the molding materials.

24 Claims, No Drawings

(56) References Cited

FOREIGN PATENT DOCUMENTS

| EP | 0853995 A1 | 7/1998 |
| EP | 1717539 A1 | 11/2006 |
| WO | WO-9104285 A1 | 4/1991 |
| WO | WO-2008006776 A1 | 1/2008 |
| WO | WO-2012156905 A1 | 11/2012 |
| WO | WO-2013035059 A1 | 3/2013 |
| WO | WO-2013052024 A1 | 4/2013 |
| WO | WO-2013113879 A1 | 8/2013 |
| WO | WO-2013113880 A1 | 8/2013 |

OTHER PUBLICATIONS

International Preliminary Report on Patentability for PCT/EP2015/061107 dated Aug. 6, 2015.
Written Opinion of the International Preliminary Examining Authority for PCT/EP2015/061107 dated Mar. 29, 2016.

* cited by examiner

PROCESS FOR IMPROVING THE FLEXURAL TOUGHNESS OF MOLDINGS

CROSS-REFERENCE TO RELATED APPLICATIONS

This application is a national stage application (under 35 U.S.C. § 371) of PCT/EP2015/061107, filed May 20, 2015, which claims benefit of European Application No. 14169200.4, filed May 21, 2014, both of which are incorporated herein by reference in their entirety.

The present invention relates to a process for improving the flexural toughness of moldings formed from molding materials comprising polyoxymethylene or a copolymer containing a majority of polyoxymethylene units, the use of specific compounds for improving the flexural toughness of moldings formed from molding materials comprising polyoxymethylene or a copolymer containing a majority of oxymethylene units, as well as the corresponding molding materials.

Metallic and ceramic moldings can be produced by injection molding of thermoplastic molding materials which contain metal or ceramic powders and organic binder materials. The binder materials are highly loaded with the metal or ceramic powders. After injection molding, extruding or pressing the filled thermoplastic molding materials to form a green body, the organic binder is removed and the debindered green body is sintered. Suitable polymer materials based on polyoxymethylene are known under the trademark Catamold®.

Thermoplastic molding materials marketed with the trademark Catamold® comprise inorganic powders, in particular metal powders or ceramic powders. Typically, these powders are first coated with a thin layer of polyethylene and then are compounded into a polyoxymethylene binder. These Catamold granules are then processed by injection molding to give a green part, converted to a brown part by removal of binder, and then sintered to give a sintered molding. The process is known as metal or ceramic injection molding (MIM or CIM) and permits production of metallic or ceramic moldings with complex shapes.

The green parts produced with use of polyoxymethylene homo- or copolymers have very good mechanical properties, in particular dimensional stability.

Binder removal is often achieved through exposure to an acidic atmosphere, for example $HNO_3$ atmosphere, between 110 and 140° C., which results in the decomposition of the POM binder. The acidic depolymerization of the POM permits complete removal of the binder. The thin polyethylene coating of the inorganic particles binds these to one another in the brown part obtained.

The brown part is preferably sintered in a sintering oven at temperatures in the range of about 1300 to 1500° C., to give the desired metal molding or ceramic molding.

WO 2008/006776 relates to thermoplastic masses containing binding agents for the production of metallic shapes. The binders comprise one or more polyoxymethylene homo- or copolymers, one or more polyolefins and poly-1,3-dioxepane or poly-1,3-dioxolane or mixtures thereof. It is stated that by employing the three components for the binder, the binder have an improved flowability and can be removed without residues upon debinding. Thus, they are said to be especially suitable for preparing injection molded bodies having a complex form.

Specifically poly-1,3-dioxepane and poly-1,3-dioxolane are typically employed as flow improvers in these binder materials based on polyoxymethylene homo- or copolymers.

WO 2013/113879 discloses polyoxymethylene copolymers with a weight-average molar mass in the range from 5000 to 15000 g/mol which are used as viscosity-modifying additive for polyoxymethylene homo- or copolymers with higher molecular weight.

Shorter-chain polyoxymethylenes or copolymers thereof typically show a very good flow behaviour, but may exhibit an increased brittleness, leading to a small elongation at break.

WO 2013/052024 discloses the resulting mixtures of polyoxymethylene homo- or copolymers of different molecular weight and their use for producing metallic or ceramic moldings. Polyoxymethylene homo- or copolymers with a weight-average molar mass in the range from 50000 to 400000 g/mol are mixed with polyoxymethylene copolymers with a weight-average molar weight in the range from 5000 to 15000 g/mol.

Parts produced from these molding materials having either low molecular weight or an admixed polyoxymethylene homo- or copolymer of low molecular weight show an improved flowability. However, the mechanical properties of the resulting moldings could need improvement for demanding applications. For removing the moldings from the mold, the moldings must exhibit a certain degree of flexibility. At the same time, the flexural toughness should be high enough so that the moldings are not adversely affected when removing them from the mold.

WO91/04285 discloses the use of non-crystalline poly-1, 3-dioxepane or poly-1,3-dioxolane as a blend partner with crystalline oxymethylene polymers to improve the impact properties of the original crystalline material. No reference is made to flexural properties.

Excessive manipulation (bending) of the green bodies when removing from the molds may lead to the formation of microcracks, which, depending on their dimensions, may not be able to close upon sintering. Consequently, microcracks may remain in the final molded parts leading to sometimes unsatisfactory mechanical properties.

The object underling the present invention is to provide an additive for molding materials comprising polyoxymethylene or a copolymer containing a majority of oxymethylene units for improving the flexural toughness of the moldings formed from the molding materials.

Advantageously, the elongation at break of the moldings formed from the molding materials shall be increased.

Sometimes, also the flexural modulus is increased.

The objects are achieved by the use of poly-1,3-dioxepane, poly-1,3-dioxolane, polytetrahydrofurane or mixtures thereof in molding materials comprising polyoxymethylene or a copolymer containing a majority of oxymethylene units, for improving the flexural toughness, preferably by increasing the elongation at break, of moldings formed from the molding materials. The majority of oxymethylene units refers to the number of repeating units in the copolymer, of which more than 50% should be oxygenethylene units The objects are furthermore achieved by a process for improving the flexural toughness, preferably by increasing the elongation at break, of moldings formed from molding materials comprising polyoxymethylene or a copolymer containing a majority of oxymethylene units, comprising the step of including poly-1,3-dioxepane, poly-1,3-dioxolane, polytetrahydrofurane or mixtures thereof in the molding material.

The objects are furthermore achieved by a molding material as defined above.

According to the present invention, it has been found that poly-1,3-dioxepane, poly-1,3-dioxolane, polytetrahydrofurane and mixtures thereof can be employed in molding materials comprising polyoxymethylene or copolymers containing a majority of oxymethylene units, for improving the flexural toughness of moldings formed from the molding materials. This effect can be observed in respective molding materials which exhibit a sufficiently low viscosity for preparing injection-molded parts or moldings. Thus, the poly-1,3-dioxepane, poly-1,3-dioxolane, polytetrahydrofurane or mixtures thereof are not included in the molding materials in order to modify the flow behaviour, but to improve the flexural toughness. They are specifically added to the molding materials to increase the elongation at break. Preferably, when starting from molding materials having a sufficiently low viscosity, both the flexural modulus and the elongation at break are increased by adding poly-1,3-dioxepane, poly-1,3-dioxolane, polytetrahydrofurane or mixtures thereof.

However, the increase of the elongation at break is the main advantage in practical applications. Stiffness and toughness are different properties. One cannot say that a material that is stiff/rigid will be tough. Stiffness and toughness do not scale linearly.

Stiffness is a measure of the rate of increase in stress in a material by the application of an increasing strain. This is the gradient of the stress-strain curve at the initial linear part of the curve.

The toughness is the total energy that can be transferred into the material, either through flexing or tension, before the materials failure. This translates to the area under the whole stress-strain curve. The elongation at break is a better indication of the materials toughness. For materials with similar stiffnesses, an increased elongation at break indicates an increased toughness.

In most instances, the use of poly (1,3-dioxepane) only marginally effects the flexural modulus but clearly increases the elongation at break. This results in an increase in flexural toughness.

According to the present invention, a new use of the poly-1,3-dioxepane, poly-1,3-dioxolane, polytetrahydrofurane or mixtures thereof has been found.

Poly-1,3-dioxepane, also known as polybutandiol formal or poly BUFO has repeating units of the structure-O—$CH_2$—O—$CH_2$—$CH_2$—$CH_2$—$CH_2$—. Poly-1,3-dioxolane has recurring units of the structure-O—$CH_2$—O—$CH_2$—$CH_2$—. The terms 1,3-dioxepane and butane diol formal are used interchangeably throughout this patent application.

The molecular weight (weight-average) of the poly-1,3-dioxepane, poly-1,3-dioxolane, polytetrahydrofurane is preferably in the range of from 2000 to 150000 g/mol, more preferably from 5000 to 50000 g/mol, particularly preferably in the range from 7000 to 35000 g/mol. These values are specifically advantageous for poly-1,3-dioxepane. For poly-1,3-dioxolane, also molecular weights in the range from 30000 to 120000 g/mol, particularly preferably 40000 to 110000 g/mol (weight-average) can be employed.

For a further description, reference can be made to component $B_3$) in WO 2008/006776.

Molecular weights or molar masses, $M_n$ and $M_w$, are determined by size exclusion chromatography in an SEC apparatus. Preferably narrowly distributed PMMA standards are used for calibration as described in the examples.

Poly-1,3-dioxepane and poly-1,3-dioxolane can be produced by processes analogous to those for the polyoxymethylene homo- or copolymers.

Preferably, the poly-1,3-dioxepane, poly-1,3-dioxolane, polytetrahydrofurane or mixtures thereof are employed in an amount, based on the sum of polyoxymethylene or a copolymer containing a majority of oxymethylene units and poly-1,3-dioxepane. poly-1,3-dioxolane, polytetrahydrofurane or mixtures thereof, of from 1 to 40% by weight, more preferably of from 3 to 30% by weight, specifically of from 4 to 26% by weight.

When molding materials are employed which additionally contain one or more polyolefins, these values can refer to the mixture of polyoxymethylene homopolymers or copolymers, polyolefins, and poly-1,3-dioxolane, poly-1,3-dioxepane or polytetrahydrofurane or mixtures thereof.

When employing polytetrahydrofurane, sometimes amounts in the range from 1 to 10% by weight, more preferably 3 to 8% by weight, specifically 4 to 6% by weight might be employed, based on the same mixture.

As polyoxymethylene or copolymer containing a majority of oxymethylene units employed in the molding materials, the usual polymers or copolymers can be employed which have the desired viscosity.

According to one embodiment of the invention, the polyoxymethylene copolymer is a polyoxymethylene copolymer with a weight-average molar mass ($M_w$) of the copolymer in the range from 20 000 to 200 000 g/mol, at least 90% by weight of which, based on the polymer, derived from trioxane and butanediol formal as monomers and butylal as regulator, with a proportion of butanediol formal, based on the polymer, in the range from 1 to 30% by weight, and a proportion of butylal, based on the polymer, in the range from 0.01 to 2.5% by weight is employed, the ./. by weight being based on the copolymer.

Preferably, the weight-average molar mass ($M_w$) is from 30 000 to 60 000 g/mol, preferably from 40 000 to 50 000 g/mol and/or the number-average molar mass ($M_n$) is from 5 000 to 18 000 g/mol, preferably from 8 000 to 16 000 g/mol, in particular from 10 000 to 14 000 g/mol.

Preferably, the $M_w/M_n$ ratio is in the range from 3 to 5, preferably from 3.5 to 4.5.

As an alternative, a mixture of different polyoxymethylene homo- or copolymers can be employed comprising from 10 to 90% by weight of a polyoxymethylene homo- or copolymer with a weight-average molar mass ($M_w$) in the range from above 60 000 to 200 000 g/mol as component B1.1 and from 10 to 90% by weight of a polyoxymethylene copolymer with a weight average molar mass ($M_w$) in the range from 10 000 to 60 000 g/mol, as component B1.2.

Preferably, at least 90% by weight of component B1.1, based on the polymer, derive from trioxane and optionally butanediol formal as monomers, preferably from trioxane and butanediol formal as monomers, with a proportion of butanediol formal, based on the polymer, in the range from 1 to 5% by weight, preferably from 2 to 3.5% by weight, in particular from 2.5 to 3% by weight.

More preferably, at least 90% by weight of component B1.2, based on the polymer, derive from trioxane and optionally butanediol formal as monomers, preferably from trioxane and butanediol formal as monomers, with a proportion of butanediol formal, based on the polymer, in the range from 2.7 to 30% by weight, preferably from 2.8 to 20% by weight, in particular from 3 to 17% by weight.

The molding materials according to the present invention are typically filed with sinterable pulverant metal, metal alloy or ceramic powders or mixtures thereof.

Preferably, a mixture (feedstock) is used, comprising:
A.) from 40 to 70% by volume of a sinterable pulverant metal or a sinterable pulverant metal alloy or a sinterable pulverant ceramic or mixtures thereof,
B.) from 30 to 60% by volume of a binder comprising of the mixture of:
  B1.) from 50 to 97% by weight of one or more polyoxymethylene homopolymers or copolymers based on the total amount of the component B;
  B2.) from 2 to 35% by weight of one or more polyolefins, based on the total amount of component B;
  B3.) from 1 to 40% by weight of poly-1,3-dioxolane, poly-1,3-dioxepane or polytetrahydrofurane or mixtures thereof, based on the total amount of component B, the sum of B1.), B2.) and B3.) adding up to 100% by weight.

Examples of suitable metal powders are Fe, Al, Cu, Nb, Ti, Mn, V, Ni, Cr, Co, Mo, W and Si powders. The metal powders can also be employed in the form of alloys, for example as intermetallic phases such as TiAl, $Ti_3Al$ and $Ni_3Al$. Graphite and carbon black are also suitable. It is of course also possible to use mixtures of said materials. Furthermore, inorganic fibers or whiskers of, for example, $Al_2O_3$, SiC, $Si_3N_4$ or C can be added to the materials, which may also contain auxiliaries, such as dispersants.

Oxydic ceramic powders are for example $Al_2O_3$, $TiO_2$, $ZrO_2$ and $Y_2O_3$, and also non-oxidic ceramic powders, such as SiC, $Si_3N_4$, TiB, and AlN, which may be used individually or in the form of a mixture.

The particle size of the powders is generally from 0.005 to 100 μm, preferably from 0.1 to 30 μm, particularly preferably from 0.2 to 10 μm.

Thermoplastic binder B.) compositions suitable for the process for producing metallic moldings are described by way of example in EP-A-0 446 708 and US 2009/0288739 A1.

The binders to be employed according to the invention comprise preferably:
B1.) from 50 to 97% by weight of one or more polyoxymethylene homopolymers or copolymers;
B2.) from 2 to 35% by weight of one or more polyolefins;
B3.) from 1 to 40% by weight of poly-1,3-dioxolane, poly-1,3-dioxepane or polytetrahydrofurane or mixtures thereof,
each based on the total amount of component B, the sum of B1.), B2.) and B3.) adding up to 100% by weight.

Component B1 is preferably used in an amount of 60 to 95% by weight, more preferably 70 to 91% by weight, based on the total amount of binder B.

For component B1, polyoxymethylene and polyoxymethylene blends advantageously have a molecular weight ($M_w$) of from 10,000 to 500,000 g/mol. In addition to homopolymers of formaldehyde or trioxane, copolymers of trioxane with, for example, cyclic ethers, such as ethylene oxide and 1,3-dioxolane, or formals, such as butanediol formal, are also suitable, the amounts of the comonomers generally being from 1 to 20% by weight of the polymers.

As a preferred constituent B1, a polyoxymethylene copolymer with a weight-average molar mass ($M_W$) in the range from 20 000 to 200 000 g/mol, at least 90% by weight of which, based on the polymer, derived from trioxane and butanediol formal as monomers and butylal as regulator, with a proportion of butanediol formal, based on the polymer, in the range from 1 to 30% by weight, and a proportion of butylal, based on the polymer, in the range from 0.01 to 2.5% by weight, is employed.

Preferably, the weight-average molar mass ($M_W$) is from 30 000 to 60 000 g/mol, preferably from 40 000 to 50 000 g/mol and/or the number-average molar mass ($M_n$) is from 5 000 to 18 000 g/mol, preferably from 8 000 to 16 000 g/mol, in particular from 10 000 to 14 000 g/mol.

Preferably, the $M_W/M_n$ ratio is in the range from 3 to 5, preferably from 3.5 to 4.5.

A second preferred constituent B1 comprises a blend of two polyoxymethylene homo- or copolymer, namely B1.1 and B1.2, in which:
from 10 to 90% by weight of a polyoxymethylene homo- or copolymer with a weight-average molar mass ($M_W$) in the range from above 60 000 to 200 000 g/mol as component B1.1 and
from 10 to 90% by weight of a polyoxymethylene copolymer as with a weight-average molar mass ($M_W$) in the range from 10 000 to 60 000 g/mol, as component B1.2.

It is preferable in both B1.1 and B1.2 that the ratio between weight-average molecular weight ($M_W$) and number-average molecular weight ($M_n$), also termed polydispersity or $M_W/M_n$, is in the range from 3 to 5, preferably from 3.5 to 4.5.

A composition is preferred wherein at least 90% by weight of component B1.1, based on the polymer, derive from trioxane and optionally butanediol formal as monomers, preferably from trioxane and butanediol formal as monomers, with a proportion of butanediol formal, based on the polymer, in the range from 1 to 5% by weight, preferably from 2 to 3.5% by weight, in particular from 2.5 to 3% by weight.

A composition is preferred where in at least 90% by weight of component B1.2 is based on the polymer, derived from trioxane and optionally butanediol formal as monomers, preferably from trioxane and butanediol formal as monomers, with a proportion of butanediol formal, based on the polymer, in the range from 1 to 30% by weight, preferably from 2.7 to 30% by weight, with preference from 2.8 to 20% by weight, in particular from 3 to 17% by weight, and a proportion of butylal, based on the polymer, in the range from 0.7 to 2.5% by weight, preferably 1.0 to 2.0% by weight, in particular 1.0 to 1.3% by weight. Furthermore, this polyoxymethylene copolymer has a weight-average molar mass ($M_W$) in the range from 10 000 to 60 000 g/mol, preferably from 30 000 to 60 000 g/mol, in particular from 40 000 to 50 000 g/mol.

Molecular weights can be determined here as described in the examples. The molecular weights are generally determined by way of gel permeation chromatography (GPC) or SEC (size exclusion chromatography). The number-average molecular weight is generally determined by GPC-SEC.

Component B1 is now described in more detail below.

Very generally, polyoxymethylene copolymers (POM) of the invention have at least 50 mol % of —$CH_2O$— repeat units in the main polymer chain. Polyoxymethylene copolymers are preferred which also have, alongside the —$CH_2O$— repeat units, up to 50 mol %, preferably from 0.01 to 20 mol %, in particular from 0.1 to 10 mol %, and very particularly preferably from 0.5 to 6 mol %, of

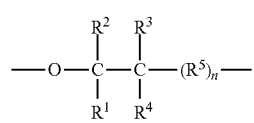

repeat units, where $R^1$ to $R^4$ are mutually independently a hydrogen atom, a $C_1$-$C_4$-alkyl group, or a halogen-substituted alkyl group having from 1 to 4 carbon atoms, and $R^6$ is —$CH_2$—, —$CH_2O$—, or a $C_1$-$C_4$-alkyl or $C_1$-$C_4$-haloalkyl-substituted methylene group, or a corresponding oxymethylene group, and n has a value in the range from 0 to 3. Said groups can advantageously be introduced into the copolymers through ring-opening of cyclic ethers. Preferred cyclic ethers are those of the formula

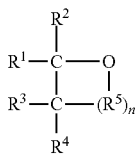

where $R^1$ to $R^5$ and n are as defined above. Merely by way of example, ethylene oxide, propylene 1,2-oxide, butylene 1,2-oxide, butylene 1,3-oxide, 1,3-dioxane, 1,3-dioxolane, and 1,3-dioxepane (=butanediol formal, BUFO) may be mentioned as cyclic ethers, and linear oligo- or polyformals, such as polydioxolane or polydioxepane, may be mentioned as comonomers.

Equally suitable materials are oxymethylene terpolymers which by way of example are produced through reaction of trioxane or of one of the cyclic ethers described above with a third monomer, preferably bifunctional compounds, of the formula

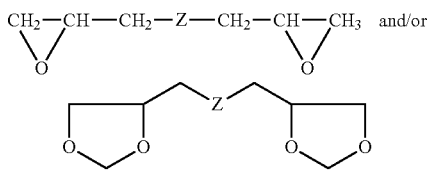

where Z is a chemical bond —O—, —ORO— (R=$C_1$-$C_8$-alkylene or $C_3$-$C_8$-cycloalkylene).

Preferred monomers of this type are ethylene diglycide, diglycidyl ether, and diethers derived from glycidyl compounds and formaldehyde, dioxane, or trioxane in a molar ratio of 2:1, and also diethers made of 2 mol of glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to mention just a few examples.

Particular preference is given to end-group-stabilized polyoxymethylene polymers which have predominantly C—C or —O—$CH_3$ bonds at the chain ends.

At least 90% by weight of the copolymers, based on the polymer, derive from trioxane and butanediol formal as monomers.

The polyoxymethylene copolymers derive, preferably exclusively, from trioxane and butanediol formal as monomers, with a proportion of butanediol formal, based on the polymer or on the monomers, in the range from 1 to 30% by weight, preferably from 2.7 to 30% by weight, with preference from 2.8 to 20% by weight, in particular from 3 to 17% by weight.

The molecular weights of the polymer are adjusted to the desired values by using butylal as regulators or chain transfer agent.

The use of butylal (n-butylal) as regulator has the advantage that it is nontoxic, whereas methylal is classified as toxic. The use of butylal as regulator represents a further advantage in comparison with the polyoxymethylene copolymers known from U.S. Pat. No. 6,388,049.

It is therefore preferable to use butylal as regulator in the production of the polymer. It is preferable to use an amount of from 0.1 to 5% by weight, based on the polymer, particularly from 0.2 to 4% by weight, in particular from 0.3 to 2% by weight, of butylal.

In conjunction with the specific amount of comonomer and with the specific molecular weight, polyoxymethylene copolymers are obtained with particularly suitable mechanical properties which make them suitable as viscosity-modifying additive for polyoxymethylene homo- or copolymers with higher molecular weight, without any major impairment of mechanical properties, in particular hardness. Flexural strength and fracture strength also remain on a high level.

The specific combination of molecular weight, proportion of comonomer, selection of comonomer, proportion of regulator, and selection of regulator in the polyoxymethylene copolymers leads to particularly suitable mechanical properties, which permit the advantageous use as viscosity-modifying additive for higher-molecular-weight polyoxymethylene homo- or copolymers.

Initiators used (also termed catalysts) are the cationic initiators conventional in trioxane polymerization. Protic acids are suitable, for example fluorinated or chlorinated alkyl- and arylsulfonic acids, examples being perchloric acid and trifluoromethanesulfonic acid, or Lewis acids, e.g. tin tetrachloride, arsenic pentafluoride, phosphorus pentafluoride, and boron trifluoride, as also are their complex compounds and salt-like compounds, examples being boron trifluoride etherates and triphenylmethyl hexafluorophosphate. The amounts used of the initiators (catalysts) are about 0.01 to 1000 ppm, preferably 0.01 to 500 ppm, and in particular from 0.01 to 200 ppm. It is generally advisable to add the initiator in dilute form, preferably at concentrations of from 0.005 to 5% by weight. Solvents used for this purpose can be inert compounds, such as aliphatic or cycloaliphatic hydrocarbons, e.g. cyclohexane, halogenated aliphatic hydrocarbons, glycol ethers, etc. Butyldiglyme (diethylene glycol dibutyl ether) and 1,4-dioxane are particularly preferred as solvents, specifically butyldiglyme.

The invention particularly preferably uses, as cationic initiators, an amount in the range from 0.01 to 1 ppm (preferably from 0.02 to 0.2 ppm, in particular from 0.04 to 0.1 ppm), based on the entirety of monomers and regulator, of Brönsted acids. In particular, $HClO_4$ is used as cationic initiator.

In addition to the initiators, cocatalysts can be used concomitantly. These are alcohols of any type, examples being aliphatic alcohols having from 2 to 20 carbon atoms, such as tert-amyl alcohol, methanol, ethanol, propanol, butanol, pentanol, hexanol; aromatic alcohols having from 2 to 30 carbon atoms, such as hydroquinone; halogenated alcohols having from 2 to 20 carbon atoms, such as hexafluoroisopropanol; very particular preference is given to glycols of any type, in particular diethylene glycol and triethylene glycol; and aliphatic dihydroxy compounds, in particular diols having from 2 to 6 carbon atoms, such as 1,2-ethanediol, 1,3-propanediol, 1,4-butanediol, 1,6-hexanediol, 1,4-hexanediol, 1,4-cyclohexanediol, 1,4-cyclohexanedimethanol, and neopentyl glycol.

Monomers, initiators, cocatalyst, and optionally regulator can be premixed in any desired manner, or else can be added separately from one another to the polymerization reactor.

The components for stabilization can moreover comprise sterically hindered phenols, as described in EP-A 129369 or EP-A 128739.

The polyoxymethylene copolymers of component B1.2 are produced by polymerization of trioxane, butanediol formal and optionally further comonomers in the presence of at least one cationic initiator and of butylal as regulator.

It is preferable that the polymerization mixture is deactivated, preferably without any phase change, directly after the polymerization reaction. The initiator residues (catalyst residues) are generally deactivated by adding deactivators (terminators) to the polymerization melt. Examples of suitable deactivators are ammonia, and also primary, secondary, or tertiary, aliphatic and aromatic amines, e.g. trialkylamines, such as triethylamine, or triacetonediamine. Other suitable compounds are salts which react as bases, for example soda and borax, and also the carbonates and hydroxides of the alkali metals and of the alkaline earth metals, and moreover also alcoholates, such as sodium ethanolate. The amounts of the deactivators usually added to the polymers are preferably from 0.01 ppmw (parts per million by weight) to 2% by weight. Preference is further given to alkyl compounds of alkali metals and of alkaline earth metals as deactivators, where these have from 2 to 30 carbon atoms in the alkyl moiety. Li, Mg, and Na may be mentioned as particularly preferred metals, and particular preference is given to n-butyllithium here.

In one embodiment of the invention, from 3 to 30 ppm, preferably from 5 to 20 ppm, in particular from 8 to 15 ppm, based on the entirety of monomers and regulator, of a chain terminator can be used concomitantly. Sodium methoxide is in particular used as chain terminator here.

POM made of trioxane and butanediol formal is generally obtained by polymerization in bulk, and any reactors with a high level of mixing action can be used for this purpose. The reaction here can be conducted homogeneously, e.g. in a melt, or heterogeneously, e.g. as polymerization to give a solid or solid granules. Examples of suitable equipment are tray reactors, plowshare mixers, tubular reactors, list reactors, kneaders (e.g. Buss kneaders), extruders, for example those having one or two screws, and stirred reactors, and the reactors here may have static or dynamic mixers. Reference can be made to WO 2013/113879 and WO 2013/052042 for the tray process which is preferable.

The lower molecular weight POM of component B1.2 can be produced particularly advantageously by using a small amount of initiator, a large amount of regulator, and capping the chain ends. The resultant POM with medium molecular weight is not only heat-resistant but also chemicals-resistant, and its viscosity can be lower by a factor of up to 1000 when it is compared with a conventional POM with high molecular weight, as used hitherto in Catamold compositions.

When the lower molecular weight POM of component B1.2 is used as viscosity-modifying additive for POM with a weight-average molar mass of above 60 000 g/mol, preferably at least 80 000 g/mol of component B1.1, the addition gives a POM system which is thermally and chemically stable and the viscosity of which can be reduced significantly.

For the structure of component B1.1 and production thereof, reference may be made to the statements above relating to component B1.2, with the exception of the molecular weight, of the $M_w/M_n$ ratio, and of the amounts of regulator and of cationic initiator. Furthermore, it is not necessary (but nevertheless preferred) that the comonomer butanediol formal is used concomitantly in component B1.1.

It is particularly preferable that both of components B1.1 and B1.2 are copolymers, in particular using the same comonomers in the same proportions of comonomer.

The amount of cationic initiator in the production process is preferably from 0.05 to 2 ppm, particularly preferably from 0.1 to 1 ppm.

The $M_w/M_n$ ratio of the resultant polyoxymethylene homo- or copolymers of component B1 is preferably in the range from 3.5 to 9, particularly from 4 to 8, in particular from 4.2 to 7.7.

In an embodiment of the invention, the thermoplastic compositions of the invention use from 10 to 90% by weight, preferably from 30 to 90% by weight, in particular from 50 to 90% by weight, of component B1.1 and correspondingly from 10 to 90% by weight, preferably from 10 to 70% by weight, in particular from 10 to 50% by weight, component B1.2.

The thermoplastic compositions are produced by separate production of components B1.1 and B1.2 and then mixing the two components. The mixing here can be achieved in any desired suitable apparatuses, such as kneaders or extruders. It is possible here to begin with mechanical premixing of solid particulate components B1.1 and B1.2, and then to melt these together. It is also possible to melt component B1.1 in an extruder and to add component B1.2 to said melt. The mixing process preferably takes place at a temperature in the range from 150 to 220° C., in particular from 180 to 200° C., under a pressure in the range from 0.5 to 5 bar, in particular from 0.8 to 2 bar.

Component B2 comprises polyolefins or mixtures thereof and is employed in an amount of from 2 to 35% by weight preferably from 3 to 20 by weight, particularly preferably from 4 to 15% by weight, based on the total amount of the binder B. Examples of preferred polymers are those derived from $C_{2-8}$-olefins, in particular from $C_{2-4}$-olefins such as ethylene and propylene, vinylaromatic monomers such as styrene and alpha-methylstyrene, vinyl esters of aliphatic $C_{1-8}$-carboxylic acids, e.g. vinyl acetate and vinyl propionate, vinyl $C_{1-8}$-alkyl ethers such as vinyl methyl ether and vinyl ethyl ether, and $C_{1-12}$-alkyl(meth)acrylates such as methyl methacrylate and ethyl methacrylate. Component B2 is preferably at least one polymer of ethylene, propylene or a copolymer of these monomers.

Polymers suitable as component B3 are poly-1,3-dioxepane, poly-1,3-dioxolane, polytetrahydrofurane or mixtures thereof in an amount of from 1 to 40% by weight, preferably 2 to 30% by weight, more preferably from 4 to 26% by weight, based on the total amount of binder B. Poly-1,3-dioxepane is particularly preferred.

After all the components have been mixed, for example in a compounder or extruder, the materials are molded, for example by injection molding in conventional screw or plunger injection-molding machines, at from 160° C. to 200° C. and at from 500 to 2 000 bar.

The resultant compacts are treated with acids, which degrade the binder polyoxymethylene to give gaseous products, predominantly formaldehyde. The gaseous degradation products are usually removed from the reaction zone.

The acid employed in the process according to the present invention can be selected from inorganic acids, preferably $HNO_3$, as well as organic acids like methanesulfonic acid or a solution of methanesulfonic acid, oxalic acid or mixtures thereof in a solvent, selected from water, $C_{1-4}$-carboxylic acids and mixtures thereof.

The treatment with these acids can be employed in the liquid or preferably in the gas phase as known from the prior art.

During binder removal, these acids can be employed either alone or together with a carrier gas, such as air, nitrogen or a noble gas.

The binder removal can be carried out under reduced pressure or preferably at atmospheric pressure, in which case a carrier gas, in particular nitrogen, is also used. There is no need for the carrier gas when binder removal is carried out under reduced pressure.

Removal of the binder can be achieved by treating the green product with a gaseous acid-containing atmosphere at a temperature in the range of from 20 to 150° C. for from 0.1 to 24 hours.

The metallic or ceramic moldings can be produced by processes known from the prior art, which are by way of example described in EP-A 0 444 475, EP-A 0 446 708 and EP-A 0 853 995. Reference may also be made to the processes described in EP-A 1 717 539 and DE-T1-100 84 853 for supplementary information.

The invention will be further illustrated by the following examples:

EXAMPLES

Production of the POM Oligomers and Polymers

Laboratory-scale polymerization was carried out in a process which simulates the circulatory tray process. The monomers and the regulator were heated to 80° C. in open iron or aluminum reactors, with magnetic stirring. The mixture here was a transparent liquid. At a juncture t=0, an initiator solution was injected, composed of $HClO_4$ in butyl-diglyme, having a proton concentration which is typically 0.05 ppm relative to the monomers, or correspondingly higher for the POM containing higher amounts of comonomer. When polymerization was successful, the mixture became cloudy within a short time (induction period typically in the region of a few seconds to one minute) and the polymer precipitated.

Post-Treatment of Raw Poly(Oxymethylene)

The raw poly(oxymethylene) is milled to a fine powder and sprayed with a 0.01 wt.-% Sodium-glycerophosphate and 0.05 wt.-% Sodiumtetraborate aqueous buffer solution.

Viscosity Measurements

Rotational rheology measurements were performed using a SR2 rotationrheometer from Rheometric Scientific. The plate dimensions were set at diameter of 25 mm and a plate-spacing of 0.8-1 mm. Measurements were performed at 190° C. and a time of 15 min. A frequency-sweep measurement was performed, and the complex viscosity at a frequency of 10 rad/s is recorded on the second sweep.

Capillary rheology measurements were performed using a Göttfert-Rheograph 2003 equipped with a capillary length of 30 mm and radius of 0.5 mm. The measurement was performed at 190° C. and a shear frequency sweep from 57 to 115201 1/s was measured.

Molar Mass Determination

The molar masses of the polymers were determined via size-exclusion chromatography in an SEC apparatus. This SEC apparatus was composed of the following combination of separating columns: a preliminary column of length 5 cm and diameter 7.5 mm, a second linear column of length 30 cm and diameter 7.5 mm. The separating material in both columns was PL-HFIP gel from Polymer Laboratories. The detector used comprised a differential refractometer from Agilent G1362 A. A mixture composed of hexafluoroisopropanol with 0.05% of potassium trifluoroacetate was used as eluent. The flow rate was 0.5 ml/min, the column temperature being 40'C. 60 microliters of a solution at a concentration of 1.5 g of specimen per liter of eluent were injected. This specimen solution had been filtered in advance through Millipor Millex GF (pore width 0.2 micrometers). Narrowly distributed PMMA standards from PSS (Mainz, Del.) with molar masses M from 505 to 2 740 000 g/mol were used for calibration.

Three-Point Bending Test

Unnotched charpy bars with dimensions (10×4×8 mm) were injected after processing the buffered polymer on a DSM mini-extruder. The polymer was extruded twice for 2 min each using a screw-speed of 80 rpm. These bars used as test specimens to determine the flexural modulus as well as the stress and elongation at break in flexural tension were using an ISO 178:2010 test. The flex-rate was set at 2 mm/min. The tests were performed at room temperature (23° C.).

Components Used in the Molding Material Compositions:

High molecular weight (HMW) POM: This POM is produced with 0.35% by weight butylal content. The number average molecular weight is 23000 g/mol, the weight average molecular weight 94000 g/mol. The ratio $M_w/M_n$ is 4.2, the viscosity at 10 rad/s is 200 Pa·s and the MFI is 42 to 43 $cm^3$/10 min. The proportion of butandiol formal comonomer was 2.7% by weight, based on the polymer. Initiator concentration was 0.05 ppm, based on the monomers.

Oligomeric POM: the oligomeric POM has a butylal concentration of 4.5 wt-%, a butandiol formal content of 2.7 wt-% (with respect to the monomer concentration), using 0.05 ppm of catalyst. The number average molecular weight was 4700 g/mol, the weight average molecular weight 11000 g/mol. The ratio $M_w/M_n$ was 3.8, the viscosity at 10 rad/s 0.1 Pa·s.

Intermediate molecular weight (IMW) POM: This POM is produced with 1 wt % butylal content, butandiol formal content a 20 wt % (with respect to the monomer concentration) and a 0.2 ppm catalyst concentration. The number average molecular weight is 12000 g/mol, the weight average molecular weight is 34000 g/mol. The ratio of $M_w/M_n$ is 2.9, the viscosity at 10 rad/s is 3.6 Pa·s.

PolyBUFO: polybutandiol formal with weight-average molecular weight from 30 000 to 60 000 g/mol.

Metal powder: stainless steel metal powder (stainless steel 17-4 PH with typical powder particle size distribution, $D_{50}$ in the range from 10 to 15 μm, $D_{90}$<30 μm).

Different molding materials were prepared using high molecular weight (HMW) POM, oligomeric POM, intermediate molecular weight (IMW) POM and PolyBUFO.

First Test Series

Comparative example C1 uses only high molecular weight POM. Comparative example 2 uses a mixture of high molecular weight POM and oligomeric POM. Example 1, according to the present invention, uses high molecular weight POM, oligomeric POM and polyBUFO.

The amounts in the different compositions are listed in the following Table 1.

| | Example | | |
|---|---|---|---|
| | C1 | C2 | 1 |
| Component 1 | High molecular weight (MW) POM | High MW POM | High MW POM |
| Loading Component 1 (wt %) | 100 | 60 | 50.4 |

-continued

| | Example | | |
|---|---|---|---|
| | C1 | C2 | 1 |
| Component 2 | PolyBUFO | Oligomeric POM | PolyBUFO |
| Loading Component 2 (wt %) | — | 40 | 9.6 |
| Component 3 | — | — | Oligomeric POM |
| Loading Component 3 (wt %) | — | — | 40 |

The compositions listed in Table 1 were used as a binder for preparing molding materials filled with metal powder (17-4 PH). The metal constitutes 91.27 wt-% of the total weight. The remaining weight/volume is that of the binder. The wt-% in Table 1 refers to the respective binder without added metal powder. The mixing of binder material a metal powder is performed in a kneading apparatus.

Afterwards, unnotched sharpy bars as indicated above were prepared from the metal filled molding materials.

The viscosity and the mechanical properties of the various molding materials are compared in the following Table 2.

| | Example | | |
|---|---|---|---|
| | C1 | C2 | 1 |
| Viscosity measured at 11520 l/rad (Pa · s) | 82 | 69.4 | 72 |
| Flexural modulus (MPa) | 7571 | 3373 | 3804 |
| Elongation at break (%) | 0.33 | 0.15 | 0.5 |

As it is evident from the results of Table 2, by including oligomeric POM to high molecular weight POM, the viscosity can be reduced to a significant extent, when compared to a composition containing high molecular weight POM, see the results of examples C2 and C1. When a combination of high molecular weight POM, oligomeric POM and poly-BUFO is employed according to example 1, the viscosity remains nearly identical to that of comparative composition C2. The flexural modulus is, however, increased when compared to comparative example C2. The elongation at break is furthermore significantly increased when compared to comparative example C2.

Examples C2 and 1 show that the addition of the poly (1,3-dioxepane) has not affected the stiffness much but the toughness is improved, since the gradient in the initial part of the stress-strain curve is similar but the area under the stress-strain curve has been distinctly increased in example 1.

Thus, the results of Table 2 show that in a POM molding material having a suitable viscosity for injection-molding, the addition of polyBUFO (poly-1,3-dioxepane) leads to an improved flexural toughness, increasing the flexural modulus and increasing the elongation of break, without adversely affecting the viscosity.

Second Test Series

Further different compositions as shown in Table 3 were evaluated. As in the first test series, the mechanical properties of the metal filled (91.27 wt-%) molding materials were measured.

TABLE 3

| Example | Component 1 | Conc. Comp. 1 (wt %) | Component 2 | Conc. Comp. 2 (wt %) | Component 3 | Conc. Comp. 3 (wt %) |
|---|---|---|---|---|---|---|
| 2 | HMW POM | 90.4 | PolyBUFO | 9.6 | | |
| 3 | HMW POM | 84.8 | PolyBUFO | 15.2 | | |
| 4 | HMW POM | 84 | PolyBUFO | 16 | | |
| 5 | HMW POM | 70 | Oligomeric POM | 30 | | |
| 6 | HWM POM | 60 | Oligomeric POM | 40 | | |
| 7 | HMW POM | 40.4 | Oligomeric POM | 40 | PolyBUFO | 9.6 |
| 8 | HWM POM | 50 | Oligomeric POM | 40 | PolyBUFO | 10 |
| 9 | HWM POM | 45 | Oligomeric POM | 40 | PolyBUFO | 15 |
| 10 | IMW POM | 100 | | | | |
| 11 | IMW POM | 90 | HMW POM | 10 | | |
| 12 | IMW POM | 80 | HMW POM | 20 | | |
| 13 | IMW POM | 80 | HMW POM | 10 | PolyBUFO | 10 |
| 14 | IMW POM | 80 | HMW POM | 4 | PolyBUFO | 16 |

Table 4 shows the results for these materials:

TABLE 4

| Example | Viscosity at 115 1/rad | Flexural stress at break (MPa) | Flexural Elongation at break (%) |
|---|---|---|---|
| 2 | 1641 | 12.93 | 4.43 |
| 3 | 1230 | 10.11 | 3.07 |
| 4 | 1346 | 10.05 | 3.27 |
| 5 | 826 | 18.47 | 0.17 |
| 6 | 1005 | 18.77 | 0.21 |
| 7 | 779 | 16.85 | 0.82 |
| 8 | 812 | 11.14 | 1.3 |
| 9 | 719 | 8.19 | 1.34 |
| 10 | 480 | 11 | 0.21 |
| 11 | 607 | 11.71 | 0.2 |
| 12 | 791 | 16.08 | 0.21 |
| 13 | 694 | 6.48 | 0.94 |
| 14 | 744 | 3.7 | 0.58 |

By employing the PolyBUFO, the flexural elongation at break could be improved significantly, leading to an improved flexural toughness.

The invention claimed is:

1. A process for improving the flexural toughness of moldings formed from a molding material comprising:
   incorporating poly-1,3-dioxepane, poly-1,3-dioxolane, polytetrahydrofurane or mixtures thereof into the molding material; and
   forming a molding from the molding material, wherein the molding has increased elongation at break compared to a molding without the poly-1,3-dioxepane, poly-1,3-dioxolane, polytetrahydrofurane, or mixture thereof;
   the molding material comprising:
   an oxymethylene polymer mixture comprising:
      (B1.1). from 10 to 90% by weight of a polyoxymethylene homopolymer or a copolymer containing a majority of oxymethylene units, with a weight-average molar mass (Mw) in the range from above 60,000 to 200,000 g/mol, and
      (B1.2). from 10 to 90% by weight of a copolymer containing a majority of oxymethylene units, with a weight-average molar mass (Mw) in the range of 10,000 to 60,000 g/mol; and
   40 to 70% by volume of sinterable pulverant metal, sinterable pulverant metal alloy, sinterable pulverant ceramic powders or mixtures thereof, based on the molding material;
   wherein, the copolymer in B1.2 is a polyoxymethylene copolymer, at least 90% by weight of which, based on the copolymer, is derived from trioxane and 1,3-dioxepane as monomers and butylal as regulator, with a proportion of 1,3-dioxepane, based on the copolymer, in the range from 1 to 30% by weight, and a proportion of butylal, based on the copolymer, in the range from 0.01 to 2.5% by weight, the % by weight being based on the copolymer and the molecular weights are determined by gel permeation chromatography or size exclusion chromatography;
   and, if B1.1 is a copolymer containing a majority of oxymethylene units, the copolymer in B1.1 is a polyoxymethylene copolymer, at least 90% by weight of which, based on the copolymer, is derived from trioxane and 1,3-dioxepane as monomers and butylal as regulator, with a proportion of 1,3-dioxepane, based on the copolymer, in the range from 1 to 30% by weight, and a proportion of butylal, based on the copolymer, in the range from 0.01 to 2.5% by weight, the % by weight being based on the copolymer and the molecular weights are determined by gel permeation chromatography or size exclusion chromatography; and
   wherein the copolymer in B1.2 has a polydispersity Mw/Mn in the range from 3 to 5.

2. The process according to claim 1, wherein the molding has improved elongation at break compared to a molding without the poly-1,3-dioxepane, poly-1,3-dioxolane, polytetrahydrofurane, or mixture thereof.

3. The process according to claim 1, wherein the poly-1, 3-dioxepane, poly-1,3-dioxolane, polytetrahydrofurane or mixtures thereof are employed in an amount, based on the sum of polyoxymethylene or a copolymer containing a majority of oxymethylene units and poly-1,3-dioxepane, poly-1,3-dioxolane, polytetrahydrofurane or mixtures thereof, of from 1 to 16% by weight.

4. The process according to claim 1, wherein the poly-1, 3-dioxepane, poly-1,3-dioxolane, polytetrahydrofurane or mixtures thereof is poly-1,3-dioxepane having a weight-average molecular weight of from 10,000 to 150,000 g/mol.

5. The process according to claim 1, wherein the weight-average molar mass ($M_W$) of the polyoxymethylene copolymer (B1.2) is from 30,000 to 60,000 g/mol and/or the number-average molar mass ($M_n$) is from 5,000 to 18,000 g/mol.

6. The process according to claim 1, wherein at least 90% by weight of component B1.1, based on the polymer, derive from trioxane and 1,3-dioxepane as monomers, with a proportion of 1,3-dioxepane, based on the polymer, in the range from 1 to 5% by weight.

7. The process according to claim 1, wherein at least 90% by weight of component B1.2, based on the polymer, derive from trioxane and optionally 1,3-dioxepane as monomers, with a proportion of 1,3-dioxepane, based on the polymer, in the range from 2.7 to 30% by weight.

8. The process according to claim 1, wherein the molding material after incorporation comprises
   A.) from 40 to 70% by volume of the sinterable pulverant metal or metal alloy or ceramic or mixture thereof;
   B.) from 30 to 60% by volume of a binder comprising the mixture of:
   B1.) from 50 to 97% by weight of the mixture of B1.1 and B1.2, based on the total amount of the component B;
   B2.) from 2 to 35% by weight of one or more polyolefins, based on the total amount of component B;
   B3.) from 1 to 40% by weight of the poly-1,3-dioxolane, poly-1,3-dioxepane or polytetrahydrofurane or mixtures thereof, based on the total amount of component B, the sum of B1.), B2.) and B3.) adding up to 100% by weight.

9. The process according to claim 1, wherein the weight-average molar mass ($M_W$) of the polyoxymethylene copolymer is from 40,000 to 50,000 g/mol and/or the number-average molar mass ($M_n$) is from 8,000 to 16,000 g/mol.

10. The process according to claim 1, wherein the number-average molar mass ($M_n$) of the polyoxymethylene copolymer is from 10,000 to 14,000 g/mol.

11. The process according to claim 5, wherein the $M_W/M_n$ ratio of the polyoxymethylene copolymer is in the range from 3.5 to 4.5.

12. The process according to claim 1, wherein at least 90% by weight of component B1.1, based on the polymer, derive from trioxane and 1,3-dioxepane as monomers, with a proportion of 1,3-dioxepane, based on the polymer, in the range 2 to 3.5% by weight.

13. The process according to claim 1, wherein at least 90% by weight of component B1.1, based on the polymer, derive from trioxane and 1,3-dioxepane as monomers, with a proportion of 1,3-dioxepane, based on the polymer, in the range from 2.5 to 3% by weight.

14. The process according to claim 1, wherein at least 90% by weight of component B1.2, based on the polymer, derive from trioxane and 1,3-dioxepane as monomers, with a proportion of 1,3-dioxepane, based on the polymer, in the range from 2.8 to 20% by weight.

15. The process according to claim 1, wherein at least 90% by weight of component B1.2, based on the polymer, derive from trioxane and 1,3-dioxepane as monomers, with a proportion of 1,3-dioxepane, based on the polymer, in the range from 3 to 17% by weight.

16. The process according to claim 1, wherein the sinterable pulverant metal, sinterable pulverant metal alloy, sinterable pulverant ceramic powders, or mixture thereof is a stainless steel metal powder.

17. The process according to claim 16, wherein the stainless steel metal powder has a particle size distribution of $D_{50}$ in the range from 10 to 15 μm.

18. The process according to claim 1, wherein the poly-1,3-dioxepane, poly-1,3-dioxolane, polytetrahydrofurane or mixture thereof is poly-1,3-dioxepane or poly-1,3-dioxolane.

19. The process according to claim 18, wherein the poly-1,3-dioxepane, poly-1,3-dioxolane, polytetrahydrofurane or mixture thereof is poly 1-3-dioxepane.

20. The process according to claim 19, wherein the poly-1,3-dioxepane is present in an amount of 9.6-16% by weight, based on the molding material.

21. The process according to claim 20, wherein poly-1,3-dioxepane, poly-1,3-dioxolane, polytetrahydrofurane or mixtures thereof is a stainless steel metal powder with a particle size distribution of $D_{50}$ in the range from 10 to 15 µm.

22. A process for improving the flexural toughness of moldings comprising providing a molding formed from molding materials comprising a mixture comprising from 10 to 90% by weight of a polyoxymethylene homo- or copolymer with a weight-average molar mass ($M_W$) in the range from above 60,000 to 200,000 g/mol as component B1.1 and from 10 to 90% by weight of a polyoxymethylene copolymer with a weight average molar mass ($M_W$) in the range from 10,000 to 60,000 g/mol, as component B1.2, comprising:
  incorporating poly-1,3-dioxepane, poly-1,3-dioxolane, polytetrahydrofurane or mixtures thereof in the molding material; and
  forming a molding from the molding material;
  wherein the molding has increased elongation at break compared to moldings without the poly-1,3-dioxepane, poly-1,3-dioxolane, polytetrahydrofurane, or mixture thereof;
  wherein the molding material is filled with sinterable pulverant metal, metal alloy, ceramic powders, or mixtures thereof;
  wherein the component B1.1 has a polydispersity $M_w/M_n$ in the range from 3 to 5.

23. The process according to claim 22, wherein the molding material after incorporation comprises A.) from 40 to 70% by volume of the sinterable pulverant metal or metal alloy or ceramic powder or mixtures thereof;
B.) from 30 to 60% by volume of a binder comprising the mixture of:
B1.) from 50 to 97% by weight of the mixture of B1.1 and B1.2, based on the total amount of the component B;
B2.) from 2 to 35% by weight of one or more polyolefins, based on the total amount of component B;
B3.) from 1 to 40% by weight of the poly-1,3-dioxolane, poly-1,3-dioxepane or polytetrahydrofurane or mixtures thereof, based on the total amount of component B, the sum of B1.), B2.) and B3.) adding up to 100% by weight.

24. A molding material comprising
A.) from 40 to 70% by volume of a sinterable pulverant metal or a sinterable pulverant metal alloy or a sinterable pulverant ceramic or mixtures thereof;
B.) from 30 to 60% by volume of a binder comprising the mixture of:
B1.) from 50 to 97% by weight of a mixture, comprising from 10 to 90% by weight of a polyoxymethylene homo- or copolymer with a weight-average molar mass ($M_W$) in the range from above 60,000 to 200,000 g/mol as component B1.1; and from 10 to 90% by weight of a polyoxymethylene copolymer with a weight average molar mass ($M_W$) in the range from 10,000 to 60,000 g/mol, as component B1.2; based on the total amount of the component B;
B2.) from 2 to 35% by weight of one or more polyolefins, based on the total amount of component B;
B3.) from 1 to 40% by weight of poly-1,3-dioxolane, poly-1,3-dioxepane or polytetrahydrofurane or mixtures thereof, based on the total amount of component B, the sum of B1.), B2.) and B3.) adding up to 100% by weight;
wherein component B1.1 has a polydispersity $M_w/M_n$ in the range from 3 to 5.

* * * * *